United States Patent
Zhang et al.

(10) Patent No.: US 11,022,581 B2
(45) Date of Patent: Jun. 1, 2021

(54) MULTIPLE FUNCTIONS ION MOBILITY SPECTROMETER DEVICE

(71) Applicants: NUCTECH COMPANY LIMITED, Beijing (CN); Tsinghua University, Beijing (CN)

(72) Inventors: Qingjun Zhang, Beijing (CN); Yuanjing Li, Beijing (CN); Zhiqiang Chen, Beijing (CN); Jianmin Li, Beijing (CN); Yaohong Liu, Beijing (CN); Weiping Zhu, Beijing (CN); Qiufeng Ma, Beijing (CN); Biao Cao, Beijing (CN); Ge Li, Beijing (CN); Wei Wang, Beijing (CN); Lili Yan, Beijing (CN); Guangqin Li, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 16/727,612

(22) Filed: Dec. 26, 2019

(65) Prior Publication Data
US 2020/0209192 A1    Jul. 2, 2020

(30) Foreign Application Priority Data
Dec. 29, 2018 (CN) .......................... 201811653906.8

(51) Int. Cl.
*G01N 27/00* (2006.01)
*G01N 27/622* (2021.01)
*H01J 49/04* (2006.01)

(52) U.S. Cl.
CPC ........ *G01N 27/622* (2013.01); *H01J 49/0422* (2013.01); *H01J 49/0459* (2013.01)

(58) Field of Classification Search
CPC . G01N 27/622; H01J 49/0422; H01J 49/0459
USPC ........................................ 250/281, 282, 288
See application file for complete search history.

(56) References Cited

U.S. PATENT DOCUMENTS

2013/0009053 A1*  1/2013  Wu ....................... H01J 49/062
                                                         250/282

* cited by examiner

*Primary Examiner* — Michael Maskell
(74) *Attorney, Agent, or Firm* — Merchant & Gould P.C.

(57) ABSTRACT

Embodiments of the present disclosure provide an ion mobility spectrometer device. The ion mobility spectrometer device includes: an ion mobility tube, a sampling device, and a sampling and circulating gas path. The sampling device includes a solid sample desorption device and a gas sampling device. The solid sample desorption device is configured to process the solid sample into a first mixed gas containing the solid sample, and the gas sampling device is configured to process the gas sample into a second mixed gas containing the gas sample. The sampling and circulating gas path is configured to transfer the first mixed gas and/or the second mixed gas into the ion mobility tube for detection.

19 Claims, 1 Drawing Sheet

MULTIPLE FUNCTIONS ION MOBILITY SPECTROMETER DEVICE

CROSS-REFERENCE TO RELATED APPLICATION

This application claims the benefit of Chinese Patent Application No. 201811653906.8, entitled "MULTIPLE FUNCTIONS ION MOBILITY SPECTROMETER DEVICE", filed with the State Intellectual Property Office of China on Dec. 29, 2018, the whole disclosure of which is incorporated herein by reference.

TECHNICAL FIELD

Embodiments of the present disclosure relate to fields of inspection of drugs, explosives, chemical warfare agents, industrial hazardous chemicals and quarantine, and particularly to an ion mobility spectrometer device.

DESCRIPTION OF RELATED ART

Ion mobility spectrometry (IMS) has the advantages of portability, fast response, high sensitiveness, and productability, and is widely used in military, defense, industrial, environmental, and clinical diagnostic fields. However, due to the interference of other complex matrixes in the detection environment, such as water vapor, identify qualitative and quantitative ability of an ion mobility spectrometry device are significantly limited.

SUMMARY

As aspect of the present disclosure provides an ion mobility spectrometer device comprising:
an ion mobility tube configured to detect a sample;
a sampling device configured to sample the sample and output a mixed gas containing the sample; and
a sampling and circulating gas path configured to be able to connect the sampling device with the ion mobility tube, so that the mixed gas containing the sample outputted by the sampling device is introduced into the ion mobility tube for detection, and at least part of a gas discharged by the ion mobility tube is returned to at least a part of the sampling device and/or the ion mobility tube;
wherein the sampling device includes a solid sample desorption device and a gas sampling device, the solid sample desorption device being configured to process the solid sample into a first mixed gas containing the solid sample, the gas sampling device being configured to process the gas sample into a second mixed gas containing the gas sample;
the sampling and circulating gas path is configured so that the first mixed gas and/or the second mixed gas can be transferred to the ion mobility tube for detection.

In an embodiment, the ion mobility tube comprises a first ion mobility tube inlet and a second ion mobility tube inlet;
the sampling and circulating gas path is configured to be able to transfer the first mixed gas into the ion mobility tube through the first ion mobility tube inlet for detection; and the second mixed gas of the gas sampling device into the ion mobility tube through the second ion mobility tube inlet for detection.

In an embodiment, the sampling and circulating gas path comprises an outer circulation sub gas path and an inner circulation sub gas path, and the outer circulation sub gas path is configured to filter the gas discharged by the ion mobility tube and transfer a part of the filtered gas to the sampling device, and then via the first ion mobility tube inlet and/or the second ion mobility tube inlet, back to the ion mobility tube, and
the inner circulation sub gas path is configured to transfer another part of the filtered gas to the ion mobility tube, wherein the ion mobility tube includes a first circulation inlet and/or a second circulation inlet, and the another part of the filtered gas is transferred to the ion mobility tube through the first circulation inlet and/or the second circulation inlet.

In an embodiment, the outer circulation sub gas path and the inner circulation sub gas path have a common gas path part, the common gas path part including a pump, configured to, in the sampling and circulating gas path, drive the gas out of the ion mobility tube and flow in the sampling and circulating gas path.

In an embodiment, the common gas path part includes a first buffer tank having a certain gas volume, and the first buffer tank is arranged in the sampling and circulating gas path, located between the ion mobility tube and the pump, and configured to communicate with the ion mobility tube so as to receive the gas discharged from the ion mobility tube.

In an embodiment, the common gas path part further comprises a second buffer tank having a certain gas volume, configured to receive the gas discharged from the pump.

In an embodiment, the common gas path part further includes a circulation filter for filtering/purifying gas, which is provided between the pump and the second buffer tank and configured to receive the gas discharged from the pump.

In an embodiment, the common gas path part further comprises a gas replenishing/discharging gas path arranged in the sampling and circulating gas path to communicate with the pump through a three-way valve so that a part of the gas from the pump can be discharged by the gas replenishing/discharging gas path out of the ion mobility spectrometer device, and an external gas can be introduced by the gas replenishing/discharging gas path into the circulation filter in the sampling and circulating gas path through the three-way valve.

In an embodiment, the ion mobility tube further comprises a first outlet and/or a second outlet configured to discharge gas in the ion mobility tube and be in fluid communication with the first buffer tank; and
the common gas path part of the inner circulation sub gas path is configured such that the gas discharged from the first outlet and/or the second outlet of the ion mobility tube passes through at least the first buffer tank, the filter, the pump and the second buffer tank in sequence, and the inner circulation sub gas path is further configured to transfer a part of the gas from the second buffer tank, via the first circulation inlet and/or the second circulation inlet of the ion mobility tube, to the ion mobility tube.

In an embodiment, the sampling and circulating gas path further comprises a conduit connection connected to the second buffer tank so that a part of the gas discharged from the second buffer tank enters the conduit connection, and at least a part of the gas passing through the conduit connection enters the outer circulation sub gas path and can be transferred to the solid sample desorption device and/or the gas sampling device.

In an embodiment, the conduit connection is a four way junction, and a part of the gas passing through the four way junction is able to be transferred into a calibration gas path when a calibration gas path valve is turned on, the calibration gas path is configured to perform a trace calibration agent addition process on the gas from the four way junction to obtain a calibration gas;

the calibration gas path is configured to be able to be in fluid communication with the outer circulation sub gas path, so that a gas flow path from the gas sampling device to the ion mobility tube is disconnected during calibration, and the calibration gas is transferred to the ion mobility tube;

wherein the calibration gas path includes a calibration part configured to provide a trace calibration agent to be mixed with the purified gas from the second buffer tank to form the calibration gas.

In an embodiment, the outer circulation sub gas path comprises a first outer circulation sub gas path part and a second outer circulation sub gas path part, and the first outer circulation sub gas path part includes a sampling tube located between the solid sample desorption device and the gas sampling device.

In an embodiment, a part of the gas passing through the conduit connection enters the first outer circulation sub gas path part and is transferred to the sampling tube; the other part of the gas passing through the conduit connection enters the second outer circulation sub gas path part and is transferred to the solid sample desorption device.

In an embodiment, the solid sample desorption device includes a solid sample desorption device configured to desorb the solid sample from a carrier to which it is adsorbed or adhered into gaseous sample particles or gaseous sample molecules by increasing temperature thereof, and a part of the second outer circulation sub gas path part is in gas communication with the solid sample desorption device through a semi-permeable membrane, so that the gaseous sample particles or gaseous sample molecules in the solid sample desorption device can enter the second outer circulation sub gas path part through the semi-permeable membrane and then is transferred to the ion mobility tube.

In an embodiment, the solid sample desorption device includes a thermal desorption sampling inlet, through which the solid sample is introduced into the solid sample desorption device, and the thermal desorption sampling inlet is sealable with a desorption sampling inlet plug.

In an embodiment, the solid sample desorption device further includes a first clean gas opening and a second clean gas opening such that the gas is able to flow through the solid sample desorption device through the first clean gas opening and the second clean gas opening to clean the solid sample desorption device.

In an embodiment, the ion mobility spectrometer device further comprises a cleaning gas path configured to allow a clean gas to flow through the solid sample desorption device and the gas sampling device, wherein the cleaning gas path includes a cleaning pump configured to be capable of sucking the gas from the solid sample desorption device so that the clean gas flows into the gas sampling device and then out of the solid sample desorption device; or configured to be capable of driving the clean gas to flow into the solid sample desorption device and through the gas sampling device;

wherein the cleaning gas path is configured to allow the clean gas to enter the solid sample desorption device from the first clean gas opening of the solid sample desorption device and flow out of the second clean gas opening, or to drive a gas to enter the solid sample desorption device from the second clean gas opening of the solid sample desorption device and flow out of the first clean gas opening and through the gas sampling device;

wherein during cleaning, a port 1 of the second two-position three-way valve is connected to the first outer circulation sub gas path part, a port 0 of the second two-position three-way valve is not in connection with the first outer circulation sub gas path part and a port 1 of a first two-position three-way valve is connected, so that the gas sampling device and the solid sample desorption device can be cleaned.

In an embodiment, the cleaning gas path comprises:

a third two-position three-way valve comprising a port 0 and a port 1 of the third two-position three-way valve;

a gas exhausting line for exhausting gas arranged between the gas outlet of the cleaning pump and the port 1 of the third two-position three-way valve; and a gas intake line configured, between the gas inlet of the clean pump and the port 0 of the third two-position three-way valve, to pump the clean gas into the cleaning gas path;

wherein the cleaning gas path has a blowing and cleaning mode where the port 1 of the third two-position three-way valve is connected such that the clean gas enters the cleaning gas path through the gas intake line under a suction action of the cleaning pump and is pumped by the cleaning pump into the cleaning gas path, passing through and cleaning the solid sample desorption device and the gas sampling device in sequence; and a reverse blowing and cleaning mode where the port 0 of the third two-position three-way valve is connected such that under the suction action of the cleaning pump, the clean gas in the cleaning gas path is pumped away from the cleaning gas path by the cleaning pump and discharged from the gas exhausting line, passing through and cleaning the gas sampling device and the solid sample desorption device in sequence.

DETAILED DESCRIPTION

In the following, the technical solutions in the embodiments of the present disclosure will be clearly and completely described with reference to the drawings in the embodiments of the present disclosure. Obviously, the described embodiments are only some of the embodiments of the present disclosure, but not all the embodiments. The following description of at least one exemplary embodiment is actually merely illustrative and in no way serves as any limitation on the disclosure and its application or use. Based on the embodiments of the present disclosure, all other embodiments obtained by a person of ordinary skill in the art without carrying out creative labor belong to the protection scope of the present disclosure.

Techniques, methods, and equipment known to those of ordinary skill in the relevant field may not be discussed in detail, but where appropriate, the techniques, methods, and equipment should be considered as part of the specification.

In the description of the present disclosure, it should be understood that the terms such as "front, back, up, down, left, right", "horizontal, vertical, perpendicular, horizontal", "top, bottom" and the like usually indicate orientation or positional relationship based on the orientation or positional relationship shown in the drawings, only for the convenience of describing the present disclosure and simplifying the description. Unless stated to the contrary, these orientation words do not indicate and imply the device or element referred to has to have a specific orientation or be constructed and operated in a specific orientation, and thus they cannot be understood as a limitation on the scope of protection of the present disclosure; the orientation words "inside, outside" refer to the inside and outside relative to a profile of a component itself.

In the description of the present disclosure, it should be understood that words such as "first" and "second" are used to define parts in different names only for the convenience of distinguishing the corresponding parts. Unless otherwise stated, the above words have no special meaning, therefore cannot be understood as limiting the scope of protection of the present disclosure.

Embodiments according to the present disclosure will be described below with reference to the drawings.

Figure 1:
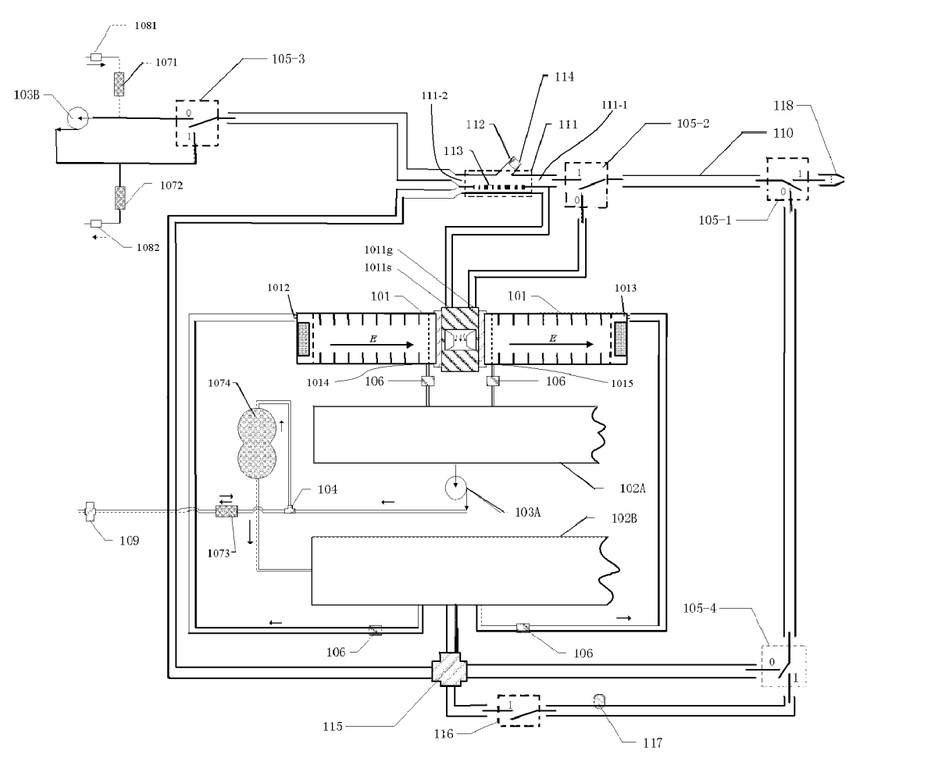
FIG. 1 illustrates a schematic view of an ion mobility spectrometer device according to an embodiment of the present disclosure.

An embodiment of the present disclosure provides an ion mobility spectrometer device including: an ion mobility tube 101 configured to detect a sample; a sampling device configured to collect a sample and output a mixed gas containing the sample. The ion mobility spectrometer device may further include a sampling and circulating gas path configured to fluidly communicate the sampling device with the ion mobility tube 101 so as to introduce the mixed gas containing the sample, outputted by the sampling device, into the ion mobility tube 101 for detection and to bring at least part of the gas discharged from the ion mobility tube 101 back to the ion mobility tube 101 and/or the sampling device. In an embodiment, the gas discharged from the ion mobility tube 101 can be purified and then used as a clean sample injecting carrier gas and a migration gas for the ion mobility tube. In this embodiment, the sampling device includes a solid sample desorption device 111 and a gas sampling device 118, wherein the solid sample desorption device 111 is configured to process the solid sample into a first mixed gas containing the solid sample, and the gas sampling device 118 is configured to process the gas sample into a second mixed gas containing the gas sample. The sampling and circulating gas path is configured to be able to bring the first mixed gas and/or the second mixed gas into the ion mobility tube 101 for detection. It should be noted that a gas transferred in the sampling and circulating gas path may be used as the carrier gas to bring particles of the solid sample or the gas samples into the ion mobility tube 101 for detection. In order to improve the universality and applicability of the ion mobility tube 101, the present disclosure provides sampling/sample injecting methods in different modes and gas sampling heads of different shapes. For particles samples such as high-boiling drugs, explosives, etc., samples can be sampled by taking/wiping an object to be inspected and injected after thermal desorption. For samples such as chemical warfare agents, industrial toxic and harmful gases, container fumigants, and VOCs, the samples are sampled and injected in way of direct suction, and the sampling heads 118 (needle-shaped (for zipper openings, packaging seams), sucking disc (for container vents), etc.) in different shapes and with different lengths that may be replaced rapidly are designed to meet different sampling needs.

According to an embodiment of the present disclosure, the ion mobility tube 101 may include a first ion mobility tube inlet 1011s and a second ion mobility tube inlet 1011g. The sampling and circulating gas path is configured to be able to transfer the first mixed gas into the ion mobility tube 101 through the first ion mobility tube inlet 1011s for detection, and transfer the second mixed gas from the gas sampling device 118 through the second ion mobility tube inlet 1011g into the ion mobility tube 101 for detection. It should be known that the first ion mobility tube inlet 1011s and the second ion mobility tube inlet 1011g are configured to transfer the mixed gas containing the sample into a reaction zone or an ionization zone of the ion mobility tube 101 for detection. The structure of the ion mobility tube 101 will not be described in detail here. In this embodiment, the ion mobility tube 101 may be a single-mode ion mobility tube or a dual-mode ion mobility tube, preferably an integrated ion mobility tube with all-ceramic tube developed by NUCTECH Co., Ltd. In the embodiment, a dual-mode ion mobility tube is taken as an example for description. For a single-mode ion mobility tube, one ion mobility tube and its related gas path may be omitted and the others are similar to those of the dual-mode ion mobility tube, and thus details are not described herein again.

According to an embodiment of the present disclosure, the sampling and circulating gas path includes an outer circulation sub gas path and an inner circulation sub gas path. The outer circulation sub gas path is configured to filter the gas discharged from the ion mobility tube 101, and a part of the filtered gas is transferred to a solid sampling device or a gas sampling device, and then passes through the first ion mobility tube inlet 1011s and/or the second ion mobility tube inlet 1011g and returns to the ion mobility tube 101. Another part of the filtered gas of the inner circulation sub gas path is transferred back to the ion mobility tube 101. In the embodiment, the ion mobility tube 101 includes a first circulation inlet 1012 and/or a second circulation inlet 1013, and the another part of the filtered gas is transferred to the ion mobility tube 101 through the first circulation inlet 1012 and/or the second circulation inlet 1013. The inner circulation sub gas path may not include a valve, and therefore, the gas may always circulate in the inner circulation sub gas path all the time. Due to the inner circulation sub gas path, the gas can be circulated without stopping, and the pump in the gas path can be operated without stopping, thereby reducing turn on and off of the pump.

As shown in the FIGURE, it can be considered that the outer circulation sub gas path and the inner circulation sub gas path have a common gas path part, and the common gas path part may include a pump 103A configured to drive the gas in the sampling and circulating gas path to leave the ion mobility tube 101 and flow in the sampling and circulating gas path. The common gas path part may include a first buffer tank 102A having a certain gas volume, and the first buffer tank is disposed between the ion mobility tube 101 and the pump 103A and is configured to be in fluid communication to the ion mobility tube 101 so as to receive the gas discharged from the ion mobility tube 101. The common gas path part may further include a second buffer tank 102B having a certain gas volume, configured to receive a gas discharged from the pump 103A. The common gas path part may further include a circulation filter 1074 for filtering/purifying gas. The circulation filter 1074 is disposed between the pump 103A and the second buffer tank in the sampling and circulating gas path and is configured to receive the gas discharged from the pump 103A.

It is advantageous to configure the outer circulation sub gas path and the internal circulation sub gas path to include a common gas path part, which can simplify the entire gas path, reduce parts, and reduce cleaning work.

The pump 103A may be a diaphragm pump. The pump 103A is used to drive the gas discharged from the ion mobility tube 101 to leave the ion mobility tube 101 and flow downstream.

In one embodiment, the first buffer tank 102A is provided on an end, configured for pumping out, of the pump 103A, and the second buffer tank 102B is provided on an end, configured for pumping in (or an intake end), of the pump 103A, which can reduce the impact of a pulsed airflow from the diaphragm pump on the signal of the ion mobility tube. A latex film with good elasticity can also be selected to be applied on at least one side of each of the rigid first buffer tank 102A and the rigid second buffer tank 102B to enhance the buffering effect, as schematically shown in the FIGURE by a curve at right of each of the first buffer tank 102A and the second buffer tank 102B. The gas is discharged from the ion mobility tube 101, enters the first buffer tank 102A, is then drawn out by the pump 103A, is pumped into the filter 1074, and then enters the second buffer tank 102B.

However, it should be understood that in other embodiments of the present disclosure, a combination of any one or more of the first buffer tank 102A, the second buffer tank 102B, the circulation filter 1074, and the pump 103A may be included.

In one embodiment, the common gas path part further includes a gas replenishing/discharging gas path, which are provided in the sampling and circulating gas path in fluid communication with the pump 103A through a three-way valve, so that a part of the gas from the pump 103A can be discharged, by the gas replenishing/discharging gas path, out of the ion mobility spectrometer device, and an external gas can be transferred through the three-way valve by the gas replenishing/discharging gas path into the circulation filter 1074 of the sampling and circulating gas path. For example, in the embodiment shown in the FIGURE, the air flow is pumped by the pump 103A to the three-way valve 104, and a part of the gas flow is discharged to outside of the entire device through the gas replenishing/discharging gas path, thereby achieving gas discharging. In addition, a gas can be replenished to the ion mobility spectrometer device through the gas replenishing/discharging gas path. At this time, the gas flows in a reversed way. An external clean gas flows into the three-way valve 104 and flows into the downstream component, i.e., the circulation filter 107-4, through the three-way valve 104. The gas replenishing/discharging gas path may include a filter 107-3, a water trap filter 109 and other components to ensure the cleanness of the replenished air.

According to this embodiment, in order to reduce the influence of temperature changes, environmental pressure changes, and micro-injection on an internal pressure of the mobility tube, the three-way valve 104 is provided between the pump 103A and the circulation filter 1074. One end of the three-way valve 104 is connected to the gas replenishing/discharging gas path, that is, the three-way valve 104 is connected to the circulation filter 1074, and the other end of the three-way valve 104 is connected to the filter 1073, the water trap filter 109, etc., of the gas replenishing/discharging gas path, and then in communication with the external environment. The gas replenishing/discharging gas path enables the ion mobility tube 101 to automatically replenish gas and discharge gas according to changes of the environment, micro-sampling, and the temperature of the mobility tube itself, thereby achieving rapid sampling while reducing the influence of the external environment on the ion mobility spectrometer device and further, improving service life of the molecular sieve and at the same time ensuring toxic and harmful gases to be effectively absorbed.

In one embodiment, the ion mobility tube 101 further includes a first outlet 1014 and a second outlet 1015, which are configured to exhaust a gas in the ion mobility tube 101 and are in fluid communication with the first buffer tank. A flow controller 106 is provided between the first outlet 1014 and the second outlet 1015 of the ion mobility spectrometer and the first buffer tank, which can facilitate adjustment of the gas flow and reading of the flow of each gas path. In one embodiment, the ion mobility tube 101 may include only one outlet for the gas. Similarly, the ion mobility tube 101 may include only one inlet for feeding the mixed gas containing a sample.

In one embodiment, the common gas path part of the inner circulation sub gas path is configured such that the gas discharged from the first outlet 1014 and/or the second outlet 1015 of the ion mobility tube 101 sequentially passes through at least the first buffer tank 102A, the circulation filter 1074, the pump 103A, and the second buffer tank 102B. The inner circulation sub gas path is further configured to transfer a part of the gas from the second buffer tank 102B, through the first circulation inlet 1012 and/or the second circulation inlet 1013 of the ion mobility tube 101, to the ion mobility tube 101. Here, the ion mobility tube 101 may be a dual-mode ion mobility tube 101, and the first circulation inlet 1012 and the second circulation inlet 1013 are respectively disposed at either end of the ion mobility tube 101. In other embodiments, for example, the ion mobility tube 101 is a single-mode ion mobility tube, and the ion mobility tube 101 includes only one circulation inlet.

In one embodiment, the common gas path part of the inner circulation sub gas path may be further configured with other elements for filtering, shock absorption and the like.

In one embodiment, the sampling and circulating gas path is configured to include a conduit connection 115 and a sampling tube 110.

In one example, the conduit connection 115 is a four way junction, which is connected to the second buffer tank, and the sampling tube 110 is located between the solid sample desorption device 111 and the gas sampling device 118. Except that the part of the gas discharged from the second buffer tank 102B flows into the inner circulation sub gas path to be circulated, the other part thereof enters the four way junction 115, and the gas passing through the four way junction 115 can be respectively led by the four way junction 115 to the sampling tube 110, the solid sample desorption device 111 and the calibration gas path. That is, a part of the gas passing through the four way junction 115 enters the outer circulation sub gas path, and can be transferred to the solid sample desorption device 111 and/or the sampling tube 110. The four way junction 115 can fluidly connect the second buffer tank 102B with a plurality of gas paths, and the flow of the gas is controlled by the valves in the gas path. In particular, it is convenient of the device to carry out the sample analysis or calibration of the gas path inside the gas path by controlling the ion mobility spectrometer device. The calibration gas path may include, for example, a calibration part (osmosis tube) 117.

In one embodiment, the sampling tube 110 may be, for example, a multi-function sampling tube. The multi-function sampling tube 110 is a flexible tube with functions of heating and thermal insulation, and is used for storing collected samples and communicating with outer circulation, calibration, long-distance sampling, sample injection, etc.

In one embodiment, the outer circulation sub gas path includes the common gas path part and the four way junction 115 described above, and the gas path part communicating with the solid sample desorption device 111 and the sampling tube 110, respectively.

The calibration gas path is configured to receive the gas from the four way junction 115 and perform a calibration process on the gas to obtain a calibrated gas. The calibration gas path communicates with the outer circulation sub gas path through a fourth two-position three-way solenoid valve 105-4. The calibration gas path includes a calibration part configured to provide a calibration agent to be mixed with the purified gas from the second buffer tank 102B to form the calibration gas. The calibration gas path is in fluid communication with the outer circulation sub gas path. During the calibration process, the gas flow path for transferring gas to the gas sampling device 118 is disconnected, and the calibration gas (instead of the mixed gas provided by the gas sampling device 118) passes through a part of the outer circulation sub gas path and is transferred to the ion mobility tube 101.

In order to facilitate the calibration of the device, in one embodiment, an online internal calibration gas path is provided. The so-called "online" refers to the calibration being operated in a working gas path. When the device/apparatus needs to be calibrated, for example, the electromagnetic on-off valve 116 is turned on, the fourth two-position three-way solenoid valve 105-4 is turned on to port 1, the fourth two-position three-way solenoid valve 105-1 is turned on to port 0, and the fourth two-position three-way solenoid valve 105-2 is turned on to port 0, such that the gas flow passes through the four way junction 115 and then the electromagnetic on-off valve 116 to carry a trace calibration agent that permeates from the calibration part (osmosis tube) 117, through the fourth, the first, and the second two-position three-way solenoid valves, to the ions ion mobility tube 101, obtaining a calibration peak position and calibration coefficient, as shown in the FIGURE. In the embodiment, the calibration can be realized in real time and irregularly. Real-time calibration is that the calibration gas path is rapidly and immediately connected and then disconnected after the sample is injected, and the purified gas (i.e., the carrier gas) loads the trace calibration agent and the sample into the ion mobility tube 101 "almost simultaneously".

The ion mobility tube can work normally without the calibration gas path. The calibration gas path can be cancelled by just changing the four way junction 115 into a three-way junction and replacing the fourth two-position three-way solenoid valve 105-4 with a straight-through pipe.

In one embodiment, the outer circulation sub gas path includes a first outer circulation sub gas path part and a second outer circulation sub gas path part, wherein a part of the gas that has passed through the four way junction 115 enters the first outer circulation sub gas path part and is transferred to the sampling tube 110; the other part of the gas that has passed through the four way junction 115 enters the second outer circulation sub gas path part, and is transferred to the solid sample desorption device 111. The first outer circulation sub gas path part and the second outer circulation sub gas path part may include the aforementioned common gas path part. At the four way junction 115, the first outer circulation sub gas path part leads to the sampling tube 110 and the second outer circulation sub gas path part leads to the solid sample desorption device 111. The calibration gas path may be regarded to be in communication with the first outer circulation sub gas path.

The gas sampling device 118 is connected to the first outer circulation sub gas path part through a first two-position three-way valve 105-1, so that the first two-position three-way valve 105-1 can be used to control the first outer circulation sub gas path part to be in a state where the first outer circulation sub gas path part is disconnected from a gas sampling port of the gas sampling device 118 and is capable of allowing the gas to circulate in the first outer circulation sub gas path part and back to the ion mobility tube 101, or to control the first outer circulation sub gas path part to be in a state where the second mixed gas of the gas sampling device 118 is transferred from the first outer circulation sub gas path part to the ion mobility tube 101 while circulation of the gas, purified by the circulation filter 1074 from the ion mobility tube 101, back to the ion mobility tube 101 is stopped.

In one embodiment, the gas sampling device 118 may be, for example, a sampling head. As shown in the FIGURE, the first outer circulation sub gas path part may include a four way junction 115. The first outer circulation sub gas path part may further include the sampling tube 110 (such as the multi-function sampling tube) and the first two-position three-way solenoid valve 105-1. The gas sampling device 118 is disposed in front of the first two-position three-way valve 105-1 connected to the multi-function sampling tube 110, and is connected to port 1 of the first two-position three-way valve 105-1. In one embodiment, a snap connection is adopted between the sampling head 118 and the first two-position three-way solenoid valve 105-1. The snap connection can not only achieve gas path communication and sealing, but also realize electrical connection. The sampling head 118 may be made of, but is not limited to, a stainless steel pipe having a preset strength. The sampling head 118 made of the stainless steel pipe has a heating function, and a microporous filter screen arranged at the forefront thereof, which can prevent dust or particles from blocking the valve or tube during sampling.

In another embodiment, the gas sampling device can be understood to include the sampling head and the sampling tube 110. It should be understood that this is only a different expression. When the first two-position three-way valve 105-1 is turned on to port 0, the first outer circulation sub gas path part is turned on and the gas sampling device cannot sample at this time; when the second two-position three-way valve 105-2 is turned on to port 1, the gas sampling device, which at this time is considered as the sampling head and the sampling tube 110, can be cleaned.

In one embodiment, a part of the gas passing through the four way junction 115 enters the second outer circulation sub gas path part and is transferred to the solid sample desorption device 111. The solid sample desorption device 111 may be configured to cause the solid sample to be detached from a carrier to which it is adsorbed or adhered into solid particles or gas molecules by increasing temperature, and a part of the second outer circulation sub gas path part is in gas communication with the solid sample desorption device 111 through a semi-permeable membrane, so that the solid sample molecules in the solid sample desorption device can enter the second outer circulation sub gas path part through the semi-permeable membrane so as to be transferred to the ion mobility tube 101.

In one embodiment, the solid sample desorption device 111 may include two passages, the first passage is connected to the second outer circulation sub gas path part and becomes a part of the second outer circulation sub gas path part, and the second passage may receive a carrier that adheres or carries the solid sample, such as a test paper, a tape, and so on. The solid sample desorption device 111 can be heated to heat the solid sample received in the second passage, so that the solid sample can be volatilized away from the carrier.

For a sample with a high boiling point, a wipe paper can be used for sampling. However, the sampling is not limited to that with the wipe paper. The solid sample desorption device 111 includes a thermal desorption sample inlet 112, from which the solid sample is transferred to the solid sample desorption device 111. For example, firstly, a wipe paper is used to wipe the object to be inspected, and then inserted into the thermal desorption sample inlet 112 of the solid sample desorption device 111 for desorption. After passing through the semi-permeable membrane 113, the sample molecules enter the second outer circulation sub gas path part and are then transferred to the ion mobility tube 101. A desorption injection inlet plug 114 is provided at an end of the thermal desorption sample inlet 112 of the solid sample desorption device 111 and configured to seal the thermal desorption sample inlet 112 when no sampling is performed.

The solid sample desorption device 111 further includes a first clean gas opening 111-1 and a second clean gas opening 111-2. A gas can flow through the solid sample desorption device 111 through the first clean gas opening 111-1 and the second clean gas opening 111-2 so as to clean the solid sample desorption device 111. In one embodiment, it can also be considered that the second passage of the solid sample desorption device 111 has two ends, which may be the first clean gas opening 111-1 and the second clean gas opening 111-2, respectively.

In one embodiment, the ion mobility spectrometer device further includes a cleaning gas path configured to allow a clean gas to flow through the solid sample desorption device 111 and the gas sampling device 118. The cleaning gas path includes a cleaning pump 103B, configured to be able to suck the gas from the solid sample desorption device 111 so that the gas is sucked from the gas sampling device 118 and enters the solid sample desorption device 111 from the first clean gas opening 111-1 of the solid sample desorption device 111, and then flows out of the solid sample desorption device 111 from the second clean gas opening 111-2, or configured to be able to drive the gas into the solid sample desorption device 111 from the second clean gas opening 111-2 of the solid sample desorption device 111, and then out of the solid sample desorption device 111 from the first clean gas opening 111-1 and to flow through the gas sampling device 118. In one embodiment, the cleaning pump 103B can be operated in a pulse mode, and only be turned on when sampling or cleaning is needed, thereby reducing the power consumption of the entire machine.

In one embodiment, the cleaning gas path is in communication with the first outer circulation sub gas path part through a port 1 of the second two-position three-way valve 105-2, and a port 0 of the second two-position three-way valve 105-2 that is in communication with the first outer circulation sub gas path part is not connected, so that when the port 1 of the second two-position three-way valve 105-2 is connected, the gas in the cleaning gas path can flow through the gas sampling device 118 and the solid sample desorption device 111 so as to clean the gas sampling device 118 and the solid sample desorption device 111, and when the port 0 of the second two-position three-way valve 105-2 is connected, the first outer circulation sub gas path part is partially turned on while the cleaning gas path is disconnected.

In one embodiment, the cleaning gas path includes a third two-position three-way valve 105-3 including a port 0 and a port 1; a gas exhausting line for exhausting gas arranged between a gas outlet of the cleaning pump and the port 1 of the third two-position three-way valve 105-3; and a gas intake line configured, for pumping a clean gas into the cleaning gas path, between a gas inlet of the cleaning pump and the port 0 of the third two-position three-way valve 105-3. Therefore, the cleaning gas path has a blowing and cleaning mode and a reverse blowing and cleaning mode. In the blowing and cleaning mode, the port 1 of the third two-position three-way valve 105-3 is connected such that, under a suction action of the cleaning pump, the clean gas enters the cleaning gas path from the gas intake line, and passes through and cleans the solid sample desorption device 111 and the gas sampling device 118 in sequence. In the reverse blowing and cleaning mode, the port 0 of the third two-position three-way valve 105-3 is connected such that, under a suction action of the cleaning pump, the gas in the cleaning gas path is pumped away from the cleaning gas path and discharged by the gas exhausting line, so that the clean gas flows through and cleans the gas sampling device 118 and the solid sample desorption device 111 in sequence.

The operation of the ion mobility spectrometer device in the FIGURE will be described below.

Due to the provision of the inner circulation sub gas path, the pump 103A can be started, and the gas (carrier gas) circulates in the inner circulation sub gas path, that is, the gas discharged from the ion mobility tube 101 enters the first buffer tank 102A through the flow controller 106, then is pumped into the pump 103A, and is discharged from the pump 103A into the three-way valve 104. When there is no need to discharge or supplement a gas, the gas enters the circulating filter 1074, and after being filtered, enters the second buffer tank 102B. Subsequently, a part of the gas from the second buffer tank 102B is transferred to the first circulation inlet 1012 and/or the second circulation inlet 1013 of the ion mobility tube 101 through a line, entering the ion mobility tube 101. When the entire system needs to be replenished or deflated, the gas from the pump 103A is discharged to outside via the three-way valve 104; or, a clean gas from the outside is transferred, through the water trap filter 109 and the filter 107-3, to the three-way valve 104, and, at the three-way valve 104, is driven under the pressure provided by the pump 103A to flow towards the circulation filter 1074, thereby completing the gas supplement.

During operation of the ion mobility tube, the pump 103A may never stop running. This is advantageous as it can reduce the instability and vibration caused by start and stop of the pump and lead to easy usage.

Another part of the gas in the second buffer tank 102B passes into the four way junction 115, so that the another part of the gas is transferred to the sampling tube 110 and the solid sample desorption device 111 through the first outer circulation sub gas path part and the second outer circulation sub gas path part respectively. In the first outer circulation sub gas path part, the gas passes through the fourth two-position three-way valve 105-4 and then flows through the gas path to the first two-position three-way valve 105-1. When the port 0 of the first two-position three-way valve 105-1 is connected, the gas is transferred to the sampling tube 110, and then to the first ion mobility tube inlet 1011$s$ through the gas path, completing the outer circulation of the gas. When the port 1 of the first two-position three-way valve 105-1 is connected, the first outer circulation sub gas path part is disconnected. In the second outer circulation sub gas path part, the gas passes through the fourth two-position three-way valve 105-4, flows through the gas path to the solid sample desorption device 111, and then enters the ion mobility tube 101 through the second ion mobility tube inlet 1011$g$. If the solid sample desorption device 111 is being operated to thermally desorb the solid sample, the molecules of the solid sample enter the second outer circulation sub gas path part through the semi-permeable membrane 113 and are carried by the gas into the ions mobility tube 101.

During the cleaning operation, the port 1 of the first two-position three-way valve 105-1 is connected, and the clean gas enters the gas sampling device 118 from its inlet, then flows through the sampling tube 110, and then is transferred, through the port 1 of the second two-position three-way valve 105-2, to the first clean gas opening 111-1 of the solid sample desorption device 111, flows through the solid sample desorption device 111, flows out of the second clean gas opening 111-2, to the third two-position three-way valve 105-3 through the gas path and enters the cleaning gas path. At this time, the port 0 of the third two-position three-way valve 105-3 is connected, and the gas is finally pumped to the gas exhausting line through the cleaning pump 103B. In this process, the cleaning pump 103B is used to suck the gas in the cleaning gas path, in which the cleaning gas path works in reverse blowing and cleaning mode.

When the port 1 of the third two-position three-way valve 105-3 is connected, the cleaning pump 103B draws gas from the gas intake line, and the gas is transferred to the solid sample desorption device 111 through the port 1 of the third two-position three-way valve 105-3, and then enters the gas sampling device 118 through the second two-position three-way valve 105-2, the sampling tube 110, and the first two-position three-way valve 105-1, completing the cleaning process. This is a blowing and cleaning mode.

The ion mobility spectrometer device in the present disclosure can not only realize the wipe sampling and semi-permeable membrane injection functions for a solid sample, but also have the gas sampling and injecting functions, as well as the function of trace gas pulse sampling and direct injecting. The minimum sampling volume of pulse sampling is only a few microliters, so that the ion mobility tube 101 using this pulse sampling and direct injecting method can maintain a high degree of cleanliness in a harsh experimental environment for a long time without interference from the external environment and achieve long-time stable work and greatly improved sensitivity. Further, the gas path has a self-cleaning function, which can greatly improve the work efficiency of the ion mobility spectrometer device. In addition, the calibration gas path in the ion mobility spectrometer device is not only easy to be operated but also enables real-time calibration of the device, which improves the environmental adaptability of the device.

Although some embodiments of the general concept of the present disclosure have been shown and described, those ordinary skilled in the art will understand that changes can be made to these embodiments without departing from the principles and spirit of the general concept. The scope of the present disclosure is defined by the claims and their equivalents.

The invention claimed is:

1. An ion mobility spectrometer device comprising:
    an ion mobility tube configured to detect a sample;
    a sampling device configured to sample the sample and output a mixed gas containing the sample; and
    a sampling and circulating gas path configured to be able to connect the sampling device with the ion mobility tube, so that the mixed gas containing the sample outputted by the sampling device is introduced into the ion mobility tube for detection, and at least part of a gas discharged by the ion mobility tube is returned to at least a part of the sampling device and/or the ion mobility tube;
    wherein the sampling device includes a solid sample desorption device and a gas sampling device, the solid sample desorption device being configured to process the solid sample into a first mixed gas containing the solid sample, the gas sampling device being configured to process the gas sample into a second mixed gas containing the gas sample;
    the sampling and circulating gas path is configured so that the first mixed gas and/or the second mixed gas can be transferred to the ion mobility tube for detection,
    wherein the ion mobility tube comprises a first ion mobility tube inlet and a second ion mobility tube inlet;
    the sampling and circulating gas path is configured to be able to transfer the first mixed gas into the ion mobility tube through the first ion mobility tube inlet for detection; and the second mixed gas of the gas sampling device into the ion mobility tube through the second ion mobility tube inlet for detection.

2. The ion mobility spectrometer device according to claim 1, wherein the sampling and circulating gas path comprises an outer circulation sub gas path and an inner circulation sub gas path, and the outer circulation sub gas path is configured to filter the gas discharged by the ion mobility tube and transfer a part of the filtered gas to the sampling device, and then via the first ion mobility tube inlet and/or the second ion mobility tube inlet, back to the ion mobility tube, and
    the inner circulation sub gas path is configured to transfer another part of the filtered gas to the ion mobility tube, wherein the ion mobility tube includes a first circulation inlet and/or a second circulation inlet, and the another part of the filtered gas is transferred to the ion mobility tube through the first circulation inlet and/or the second circulation inlet.

3. The ion mobility spectrometer device according to claim 2, wherein the outer circulation sub gas path and the inner circulation sub gas path have a common gas path part, the common gas path part including a pump, configured to, in the sampling and circulating gas path, drive the gas out of the ion mobility tube and flow in the sampling and circulating gas path.

4. The ion mobility spectrometer device according to claim 3, wherein the common gas path part includes a first buffer tank having a certain gas volume, and the first buffer tank is arranged in the sampling and circulating gas path, located between the ion mobility tube and the pump, and configured to communicate with the ion mobility tube so as to receive the gas discharged from the ion mobility tube.

5. The ion mobility spectrometer device according to claim 4, wherein the common gas path part further comprises a second buffer tank having a certain gas volume, configured to receive the gas discharged from the pump.

6. The ion mobility spectrometer device according to claim 5, wherein the common gas path part further includes a circulation filter for filtering/purifying gas, which is provided between the pump and the second buffer tank and configured to receive the gas discharged from the pump.

7. The ion mobility spectrometer device according to claim 6, wherein the common gas path part further comprises a gas replenishing/discharging gas path arranged in the sampling and circulating gas path to communicate with the pump through a three-way valve so that a part of the gas from the pump can be discharged by the gas replenishing/discharging gas path out of the ion mobility spectrometer device, and an external gas can be introduced by the gas replenishing/discharging gas path into the circulation filter in the sampling and circulating gas path through the three-way valve.

8. The ion mobility spectrometer device according to claim 6, wherein the ion mobility tube further comprises a first outlet and/or a second outlet configured to discharge gas in the ion mobility tube and be in fluid communication with the first buffer tank; and the common gas path part of the inner circulation sub gas path is configured such that the gas discharged from the first outlet and/or the second outlet of the ion mobility tube passes through at least the first buffer tank, the filter, the pump and the second buffer tank in sequence, and the inner circulation sub gas path is further configured to transfer a part of the gas from the second buffer tank, via the first circulation inlet and/or the second circulation inlet of the ion mobility tube, to the ion mobility tube.

9. The ion mobility spectrometer device according to claim 5, wherein the sampling and circulating gas path further comprises a conduit connection connected to the second buffer tank so that a part of the gas discharged from the second buffer tank enters the conduit connection, and at least a part of the gas passing through the conduit connection enters the outer circulation sub gas path and can be transferred to the solid sample desorption device and/or the gas sampling device.

10. The ion mobility spectrometer device according to claim 9, wherein the conduit connection is a four way junction, and a part of the gas passing through the four way junction is able to be transferred into a calibration gas path when a calibration gas path valve is turned on, the calibration gas path is configured to perform a trace calibration agent addition process on the gas from the four way junction to obtain a calibration gas;

the calibration gas path is configured to be able to be in fluid communication with the outer circulation sub gas path, so that a gas flow path from the gas sampling device to the ion mobility tube is disconnected during calibration, and the calibration gas is transferred to the ion mobility tube;

wherein the calibration gas path includes a calibration part configured to provide a trace calibration agent to be mixed with the purified gas from the second buffer tank to form the calibration gas.

11. The ion mobility spectrometer device according to claim 9, wherein the outer circulation sub gas path comprises a first outer circulation sub gas path part and a second outer circulation sub gas path part, and the first outer circulation sub gas path part includes a sampling tube located between the solid sample desorption device and the gas sampling device.

12. The ion mobility spectrometer device according to claim 11, wherein:

a part of the gas passing through the conduit connection enters the first outer circulation sub gas path part and is transferred to the sampling tube; the other part of the gas passing through the conduit connection enters the second outer circulation sub gas path part and is transferred to the solid sample desorption device.

13. The ion mobility spectrometer device according to claim 11, wherein:

the gas sampling device is connected to the first outer circulation sub gas path part through a first two-position three-way valve, by which the first outer circulation sub gas path part is controlled to be in a state that it is in disconnection to the gas sampling device and the gas is allowed be circulated in the first outer circulation sub gas path part back to the ion mobility tube, or to be in a state that the second mixed gas from the gas sampling device is transferred to the ion mobility tube while circulation of the purified gas, from the ion mobility tube, back to the ion mobility tube is stopped.

14. The ion mobility spectrometer device according to claim 11, wherein a part of the gas passing through the conduit connection enters the first outer circulation sub gas path part and is transferred to the sampling tube; the other part of the gas passing through the conduit connection enters the second outer circulation sub gas path part and is transferred to the solid sample desorption device.

15. The ion mobility spectrometer device according to claim 11, wherein the solid sample desorption device is configured to desorb the solid sample from a carrier to which it is adsorbed or adhered into gaseous sample particles or gaseous sample molecules by increasing temperature thereof, and a part of the second outer circulation sub gas path part is in gas communication with the solid sample desorption device through a semi-permeable membrane, so that the gaseous sample particles or gaseous sample molecules in the solid sample desorption device can enter the second outer circulation sub gas path part through the semi-permeable membrane and then is transferred to the ion mobility tube.

16. The ion mobility spectrometer device according to claim 15, wherein the solid sample desorption device includes a thermal desorption sampling inlet, through which the solid sample is introduced into the solid sample desorption device, and the thermal desorption sampling inlet is sealable with a desorption sampling inlet plug.

17. The ion mobility spectrometer device according to claim 15, wherein:

the solid sample desorption device further includes a first clean gas opening and a second clean gas opening such that the gas is able to flow through the solid sample desorption device through the first clean gas opening and the second clean gas opening to clean the solid sample desorption device.

18. The ion mobility spectrometer device according to claim 1 or 17 further comprising a cleaning gas path configured to allow a clean gas to flow through the solid sample desorption device and the gas sampling device, wherein the cleaning gas path includes a cleaning pump configured to be capable of sucking the gas from the solid sample desorption device so that the clean gas flows into the gas sampling device and then out of the solid sample desorption device; or configured to be capable of driving the clean gas to flow into the solid sample desorption device and through the gas sampling device;

wherein the cleaning gas path is configured to allow the clean gas to enter the solid sample desorption device from the first clean gas opening of the solid sample desorption device and flow out of the second clean gas opening, or to drive a gas to enter the solid sample desorption device from the second clean gas opening of the solid sample desorption device and flow out of the first clean gas opening and through the gas sampling device;

wherein during cleaning, a port 1 of the second two-position three-way valve is connected to the first outer circulation sub gas path part, a port 0 of the second two-position three-way valve is not in connection with the first outer circulation sub gas path part and a port 1 of a first two-position three-way valve is connected, so that the gas sampling device and the solid sample desorption device can be cleaned.

19. The ion mobility spectrometer device according to claim 18, wherein the cleaning gas path comprises:
- a third two-position three-way valve comprising a port 0 and a port 1 of the third two-position three-way valve;
- a gas exhausting line for exhausting gas arranged between the gas outlet of the cleaning pump and the port 1 of the third two-position three-way valve; and
- a gas intake line configured, between the gas inlet of the clean pump and the port 0 of the third two-position three-way valve, to pump the clean gas into the cleaning gas path;
- wherein the cleaning gas path has a blowing and cleaning mode where the port 1 of the third two-position three-way valve is connected such that the clean gas enters the cleaning gas path through the gas intake line under a suction action of the cleaning pump and is pumped by the cleaning pump into the cleaning gas path, passing through and cleaning the solid sample desorption device and the gas sampling device in sequence; and a reverse blowing and cleaning mode where the port 0 of the third two-position three-way valve is connected such that under the suction action of the cleaning pump, the clean gas in the cleaning gas path is pumped away from the cleaning gas path by the cleaning pump and discharged from the gas exhausting line, passing through and cleaning the gas sampling device and the solid sample desorption device in sequence.

* * * * *